(12) United States Patent
Kong et al.

(10) Patent No.: US 9,948,670 B2
(45) Date of Patent: Apr. 17, 2018

(54) CLOUD SECURITY-BASED FILE PROCESSING BY GENERATING FEEDBACK MESSAGE BASED ON SIGNATURE INFORMATION AND FILE FEATURES

(71) Applicant: Beijing Qihoo Technology Company Limited, Beijing (CN)

(72) Inventors: Qinglong Kong, Beijing (CN); Tong Yao, Beijing (CN); Bo Zhang, Beijing (CN); Zhifeng Liu, Beijing (CN); Aijun Jiang, Beijing (CN)

(73) Assignee: Beijing Qihoo Technology Company Limited, Beijing (CN)

( * ) Notice: Subject to any disclaimer, the term of this patent is extended or adjusted under 35 U.S.C. 154(b) by 120 days.

(21) Appl. No.: 14/896,298

(22) PCT Filed: Jun. 3, 2014

(86) PCT No.: PCT/CN2014/079076
§ 371 (c)(1),
(2) Date: Dec. 4, 2015

(87) PCT Pub. No.: WO2014/194803
PCT Pub. Date: Dec. 11, 2014

(65) Prior Publication Data
US 2016/0119375 A1    Apr. 28, 2016

(30) Foreign Application Priority Data
Jun. 4, 2013    (CN) .......................... 2013 1 0219053

(51) Int. Cl.
*G06F 12/14* (2006.01)
*H04L 29/06* (2006.01)
*H04L 29/08* (2006.01)

(52) U.S. Cl.
CPC ...... *H04L 63/1441* (2013.01); *H04L 63/1416* (2013.01); *H04L 67/06* (2013.01);
(Continued)

(58) Field of Classification Search
CPC ....... H04L 63/1491; G06F 21/55; G06F 21/62
(Continued)

(56) References Cited

U.S. PATENT DOCUMENTS 7,895,651 B2 * 2/2011 Brennan ................. G06F 21/55
                                                            705/51
8,572,730 B1 * 10/2013 Sobel .................... H04L 9/0891
                                                            726/1

(Continued)

FOREIGN PATENT DOCUMENTS

CN    101594248 A    12/2009
CN    101719846 A    6/2010
(Continued)

OTHER PUBLICATIONS

International Search Report and Written Opinion for Application No. PCT/NC2014/079076 dated Sep. 2, 2014, p. 1.

*Primary Examiner* — Haresh N Patel
(74) *Attorney, Agent, or Firm* — Alston & Bird LLP

(57) ABSTRACT

The invention discloses a cloud security-based file processing method and apparatus. The method comprises: generating a signature identifier uniquely corresponding to an unknown program file downloaded locally according to signature related information of the unknown program file; sending a query request to a server end to query whether the unknown program file is a malicious program or not, wherein the query request carries the signature identifier of the unknown program file and a part or all of the file features of the unknown program file; and receiving a feedback message from the server end, and performing subsequent (Continued)

process on the unknown program file according to the feedback message, wherein the server end generates the feedback message according to the signature identifier and the file features. The invention solves the problem of breaking through the cloud killing by utilizing a Trojan in the prior art and at the same time can also reduce the time from discovering a malicious program to killing the malicious program, thereby accelerating the speed of fighting against a new malicious program, reducing the information storage amount of the server as well and in turn guaranteeing the security of a client program.

12 Claims, 4 Drawing Sheets

(52) U.S. Cl.
CPC .............. *H04L 67/10* (2013.01); *H04L 67/42* (2013.01); *H04L 63/145* (2013.01)
(58) Field of Classification Search
USPC ............................................................ 726/7
See application file for complete search history.

(56) References Cited

U.S. PATENT DOCUMENTS

| | | | |
|---|---|---|---|
| 8,590,039 B1* | 11/2013 | Muttik | H04L 63/1416 726/22 |
| 2005/0172324 A1* | 8/2005 | Touboul | H04L 63/14 725/109 |
| 2007/0028110 A1* | 2/2007 | Brennan | G06F 21/552 713/176 |
| 2011/0246741 A1* | 10/2011 | Raymond | G06F 17/30159 711/170 |
| 2012/0117648 A1* | 5/2012 | Kallio | G06F 21/564 726/23 |

FOREIGN PATENT DOCUMENTS

| | | |
|---|---|---|
| CN | 102663288 A | 9/2012 |
| CN | 102693388 A | 9/2012 |
| CN | 103281325 A | 9/2013 |

\* cited by examiner

CLOUD SECURITY-BASED FILE PROCESSING BY GENERATING FEEDBACK MESSAGE BASED ON SIGNATURE INFORMATION AND FILE FEATURES

FIELD OF THE INVENTION

The invention relates to the field of information security, and in particular, to a cloud security-based file processing method and apparatus.

BACKGROUND OF THE INVENTION

Nowadays, with the increasing growth of malicious programs, the traditional way of killing a virus in which the killing is done based on a feature code and a virus library is updated regularly already can not deal with such a situation, which promotes the rise of a cloud security technology in which a large number of clients track, and kill malicious programs.

Most of the cloud security technologies in the prior art employ a way of combining a local engine of a client and a cloud security server side, and in particular kill a malicious program by the following way:

the local engine of the client scanning according to a scanning position where it is embedded, and sending features of an unknown program file that can not be identified locally to the cloud security server, the cloud security server comparing the received features of the program file and judging whether it is a malicious program, and if it is a malicious program, the local engine of the client performing corresponding processing on the malicious program according to its preset malicious program processing method.

However, when an author of a malicious program antagonizes security software, in order to evade the detection of security protection software, the malicious software will find out a new available point in an operating system or find out a point that is disregarded by the security software, thereby bypass the detection and killing of the security software. Thus, it is necessary for a security manufacturer to analyze samples of new malicious programs so as to update security software of the client. However, in the procedure of upgrading the security software, the malicious program has already been widely spread. It is thus clear that the methods of the prior art can not timely detect and kill a malicious program.

SUMMARY OF THE INVENTION

In view of the above problems, the invention provides a cloud security-based file processing method and apparatus to overcome the above problems or at least in part solve the above problems.

According to an aspect of the invention, there is provided a cloud security-based file processing method comprising:

generating a signature identifier uniquely corresponding to an unknown program file downloaded locally according to signature related information of the unknown program file;

sending a query request to a server end to query whether the unknown program file is a malicious program or not, wherein the query request carries the signature identifier of the unknown program file and a part or all of the file features of the unknown program file; and receiving a feedback message from the server end, and performing subsequent process on the unknown program file according to the feedback message, wherein the server end generates the feedback message according to the signature identifier and the file features.

Optionally, the signature related information and the file features are obtained according to the following steps comprising:

scanning the unknown program file to obtain the file features; and extracting the signature related information from the file features.

Optionally, the file features comprise at least one of the following:

the MD5 (Message Digest Algorithm 5), SHA1 (Secure Hash Algorithm), and a feature value calculated according to part of the content extracted from the file.

Optionally, the generating a signature identifier uniquely corresponding to an unknown program file downloaded locally according to signature related information of the unknown program file comprises:

obtaining the computable field of a portable executable PE file, wherein the computable field is the remaining part in the PE file except the PE check segment, the signature segment and the signature content; and computing the computable field and taking the computation result as the signature identifier.

Optionally, the performing subsequent process according to the feedback message comprises:

receiving a killing method fed back by the server end and corresponding to the signature identifier when the signature identifier is matched at the server end successfully.

Optionally, after receiving a killing method fed back by the server end, there is comprised:

downloading from the server end a preset detection condition with respect to information parameters of the unknown program file, and judging whether the unknown program file meets the detection condition; and uploading the judgment result to the server end and performing subsequent process according to an instruction of the server end.

Optionally, the detection condition comprises at least one of the following:

whether a specific file loaded by the PE has an effective signature of a specific company;

whether the internal name, product name and company name of a specific file loaded by the PE are specified names;

whether a specific hook is mounted in the system;

whether there is specific filling data Shellcode in a specific process;

whether there exists a specific driver module or device object in the system;

whether a specific registry points to a specific file or a specific unique identifier CLSID or matches a specific mode; and whether a file of which the security is unknown exists in a process chain loaded by the PE.

Optionally, the performing subsequent process according to an instruction of the server end comprises:

receiving from the server end a reminder message that the unknown program file might be infected with a malicious program; and/or killing the unknown program file when receiving from the server end a killing command of killing the unknown program file; and/or killing the unknown program file by the server end when receiving a killing instruction triggered in a user interface.

Optionally, the killing method comprises: a scanning/judging action and/or a repair action.

According to an aspect of the invention, there is further provided a cloud security-based file processing method comprising:

receiving a query request from a client, wherein the query request comprises the signature identifier of an unknown program file and a part or all of the file features of the unknown program file;

generating a feedback message according to the signature identifier and the file features;

sending the feedback message to the client, wherein the client performs subsequent process on the unknown program file according to the feedback message.

Optionally, the sending the feedback message to the client comprises:

matching the signature identifier in a database; and returning a matched killing method to the client.

Optionally, the database comprises: a local database and/or a cloud database.

Optionally, before the receiving a query request from a client, there is comprised: receiving from the client file features of the unknown program file.

Optionally, after the returning a matched killing method to the client, there is further comprised:

sending a preset detection condition with respect to information parameters of the unknown program file to the client;

receiving the detection result from the client; and sending a corresponding instruction according to the detection result.

Optionally, the sending a corresponding instruction according to the detection result comprises:

sending to the client a reminder message that the unknown program file might be infected with a malicious program according to the detection result; and/or sending a corresponding command according to the detection result, wherein the corresponding command comprises a killing command of killing the unknown program file and a command of releasing a secure file.

According to another aspect of the invention, there is provided a cloud security-based file processing apparatus comprising:

a generating module configured to generate a signature identifier uniquely corresponding to an unknown program file downloaded locally according to signature related information of the unknown program file;

a query module configured to send a query request to a server end to query whether the unknown program file is a malicious program or not, wherein the query request carries the signature identifier of the unknown program file and a part or all of the file features of the unknown program file; and a processing module configured to receive a feedback message from the server end, and perform subsequent process on the unknown program file according to the feedback message, wherein the server end generates the feedback message according to the signature identifier and the file features.

Optionally, the apparatus further comprises:

an extracting module configured to scan the unknown program file to obtain the file features; and extract the signature related information from the file features.

Optionally, the file features comprise at least one of the following:

the MD5, SHA1, and a feature value calculated according to part of the content extracted from the file.

Optionally, the generating module is further configured to:

obtain the computable field of a portable executable PE file, wherein the computable field is the remaining part in the PE file except the PE check segment, the signature segment and the signature content; and compute the computable field and take the computation result as the signature identifier.

Optionally, the processing module is further configured to:

receive a killing method fed back by the server end and corresponding to the signature identifier when the signature identifier is matched at the server end successfully.

Optionally, the processing module is further configured to:

download from the server end a preset detection condition with respect to information parameters of the unknown program file, and judge whether the unknown program file meets the detection condition; and upload the judgment result to the server end and perform subsequent process according to an instruction of the server end.

Optionally, the processing module is further configured to:

receive from the server end a reminder message that the unknown program file might be infected with a malicious program; and/or kill the unknown program file when receiving from the server end a killing command of killing the unknown program file; and/or kill the unknown program file by the server end when receiving a killing instruction triggered in a user interface.

Optionally, the killing method comprises: performing a scanning/judging action and/or a repair action on the unknown program file.

According to another aspect of the invention, there is further provided a cloud security-based file processing apparatus comprising:

a receiving module configured to receive a query request from a client, wherein the query request comprises the signature identifier of an unknown program file and a part or all of the file features of the unknown program file; and a sending module configured to generate a feedback message according to the signature identifier and the file features, and send the feedback message to the client, wherein the client performs subsequent process on the unknown program file according to the feedback message.

Optionally, the sending module comprises:

a matching unit configured to match the signature identifier in a database; and a sending unit configured to send a matched killing method to the client.

Optionally, the database comprises: a local database and/or a cloud database.

Optionally, the receiving module is further configured to receive from the client file features of the unknown program file.

Optionally, the sending module is further configured to send a preset detection condition with respect to information parameters of the unknown program file to the client;

the receiving module is further configured to receive the detection result from the client; and the sending module is further configured to send a corresponding instruction according to the detection result.

Optionally, the sending module is further configured to
send to the client a reminder message that the unknown
program file might be infected with a malicious program
according to the detection result; and/or send a corresponding command according to the detection result, wherein the corresponding command comprises a killing command of killing the unknown program file and a command of releasing a secure file.

According to yet another aspect of the invention, there is provided a computer program comprising a computer readable code which causes a computing device to perform the cloud security-based file processing method as disclosed herein, and/or the cloud security-based file processing method as disclosed herein, when said computer readable code is running on the computing device.

According to still another aspect of the invention, there is provided a computer readable medium storing the above described computer program therein.

The beneficial effects of the invention lie in that:

The invention provides a cloud security-based file processing method and apparatus. By the invention, the client can obtain a local unknown program file timely, generate a signature identifier uniquely corresponding to the program file and send it to the server end, and the server end can obtain a corresponding feedback message according to the received signature identifier and return it to the client, and the client performs corresponding process on the unknown program file according to the feedback message.

It is thus clear that the method and apparatus provided by the invention enables the client to obtain a processing method with respect to an unknown program file from the server side in real time and dynamically, and to kill a malicious program timely, which solves the problem of breaking through the cloud killing by utilizing a Trojan in the prior art. In addition, as compared to that a new malicious program can be only detected and killed by upgrading a local feature library and an engine program file in the prior art, the invention further reduces the time from discovering a malicious program to killing the malicious program, thereby accelerating the speed of fighting against a new malicious program, reducing the information storage amount of the server as well and in turn guaranteeing the security of a client program.

The above description is merely an overview of the technical solutions of the invention. In the following particular embodiments of the invention will be illustrated in order that the technical means of the invention can be more clearly understood and thus may be embodied according to the content of the specification, and that the foregoing and other objects, features and advantages of the invention can be more apparent.

BRIEF DESCRIPTION OF THE DRAWINGS

Various other advantages and benefits will become apparent to those of ordinary skills in the art by reading the following detailed description of the preferred embodiments. The drawings are only for the purpose of showing the preferred embodiments, and are not considered to be limiting to the invention. And throughout the drawings, like reference signs are used to denote like components. In the drawings.

DETAILED DESCRIPTION OF THE INVENTION

In the following the invention will be further described in connection with the drawings and the particular embodiments.

The algorithms and displays provided here are not inherently related to any specific computer, virtual system or other device. Various general-purpose systems may also be used with the teachings herein. According to the above description, the structure required for constructing such systems is obvious. In addition, the invention is not directed to any specific programming language. It should be understood that the content of the invention described herein may be carried out utilizing various programming languages, and that the above description for a specific language is for the sake of disclosing preferred embodiments of the invention.

Invention may be applied in a computer system/server, which may be operated together with a multitude of other general- or special-purpose computing system environments or configurations. Examples of well known computing systems, environments and/or configurations suitable for use with a computer system/server comprise, but not limited to, a personal computer system, a server computer system, a thin client, a thick client, a hand held or laptop device, a microprocessor-based system, a set-top box, a programmable consumer electronic product, a network personal computer, a small computer system, a large computer system and a distributed cloud computing environment comprising the any above system, etc.

A computer system/server may be described in the general context of a computer system executable instruction (such as a program module) executed by a computer system. In general, the program module may comprise a routine, a program, target program, component, logic, data structure, etc., which performs a specific task or implements a specific abstract data type. The computer system/server may be embodied in a distributed cloud computing environment, and in the distributed cloud computing environment, a task is performed by a remote processing device linked by a communication network. In the distributed cloud computing environment, the program module may be located on a local or remote computing system storage medium comprising a storage device.

Embodiment One

Figure 1:
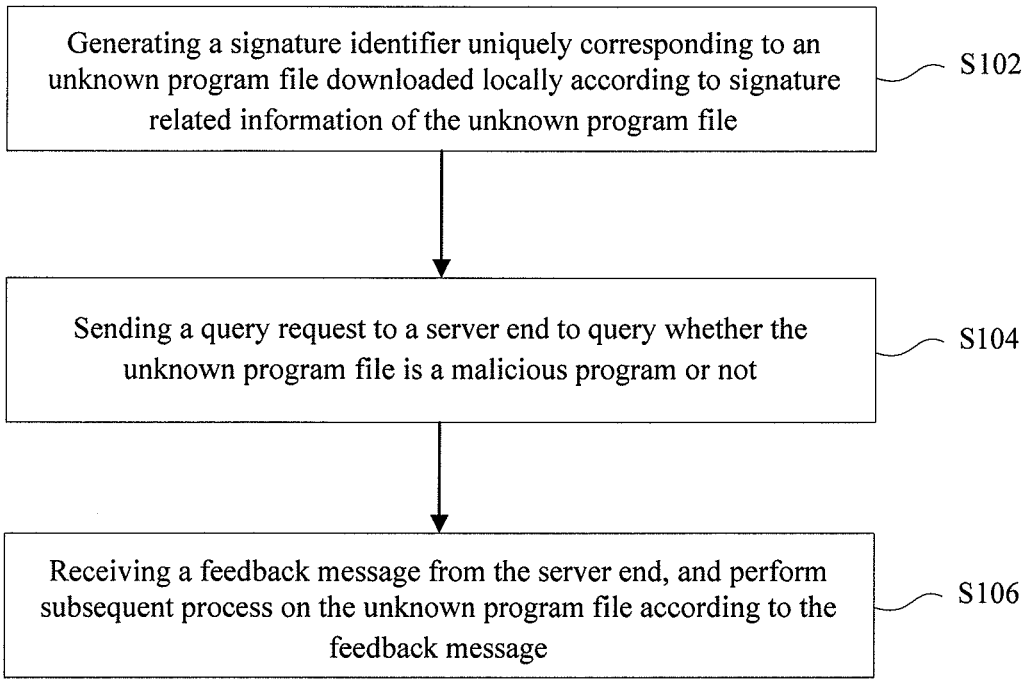
FIG. 1 shows a flow chart of a cloud security-based file processing method according to an embodiment of the invention.

FIG. 1 shows a flow chart of a cloud security-based file processing method according to an embodiment of the invention. In this method, the client for processing a local program is improved, and the method specifically comprises the steps S102 to S106.

S102: generating a signature identifier uniquely corresponding to an unknown program file downloaded locally according to signature related information of the unknown program file.

S104: sending a query request to a server end to query whether the unknown program file is a malicious program or not, wherein the query request carries the signature identifier of the unknown program file and a part or all of the file features of the unknown program file.

Therein, the file features in this embodiment may comprise the MD5 value, the SHA1 value of a file, or a feature value calculated according to part of the content extracted from the file. They may further comprise information on a DLL (Dynamic Link Library) that might be loaded by the file and description information on the DLL, whether the file is infected by a Trojan to be a file of which the security is unknown or a dangerous file; or comprise judging whether a specified file/directory exists, whether an attribute of the file meets a condition (for example, whether the MD5 of the file is a specified value), whether a specified registry key/value exists, whether the content of the registry key/value meets a condition, whether a specified process/service exists, or the like.

Therein, a corresponding relationship between a file feature value and security level information is pre-stored at the server end. The security level information determined by the server end may be customized, for example, comprise a level such as secure, dangerous, unknown, etc., or also may be differentiated by employing a way of a first level, a second level, a third level, etc., as long as it can reflect whether an individual module is secure or not. Or, the security rank information comprises: the secure level, the unknown level, the suspicious level, the highly suspicious level and the malicious level, wherein the malicious level is the highest level, the secure level is the lowest level. For example, a level when it is 10-20 may be set to be the secure level, a level when it is 30-40 may be set to be the unknown level, a level when it is 50-60 may be set to be the suspicious level and the highly suspicious level, and a level when it is greater than 70 may be set to be the malicious level.

S106: receiving a feedback message from the server end, and performing subsequent process on the unknown program file according to the feedback message, wherein the server end generates the feedback message according to the signature identifier and the file features.

In this embodiment, the feedback message is a killing method fed back by the server end and corresponding to the signature identifier, such that the client can perform corresponding process on the unknown file according to the killing method.

The cloud security-based file processing method provided by the embodiment of the invention enables the client to obtain a local unknown program file timely, generate a signature identifier uniquely corresponding to the program file and send it to the server end, obtain a corresponding feedback message from the server end, and perform corresponding process on the unknown program file according to the feedback message.

It is thus clear that the method provided by the embodiment of the invention enables the client to obtain a processing method with respect to an unknown program file from the server side in real time and dynamically, and to kill a malicious program timely, which solves the problem of breaking through the cloud killing by utilizing a Trojan in the prior art. In addition, as compared to that a new malicious program can be only detected and killed by upgrading a local feature library and an engine program file in the prior art, the method further reduces the time from discovering a malicious program to killing the malicious program, thereby accelerating the speed of fighting against a new malicious program, reducing the information storage amount of the server as well and in turn guaranteeing the security of a client program.

Figure 2:
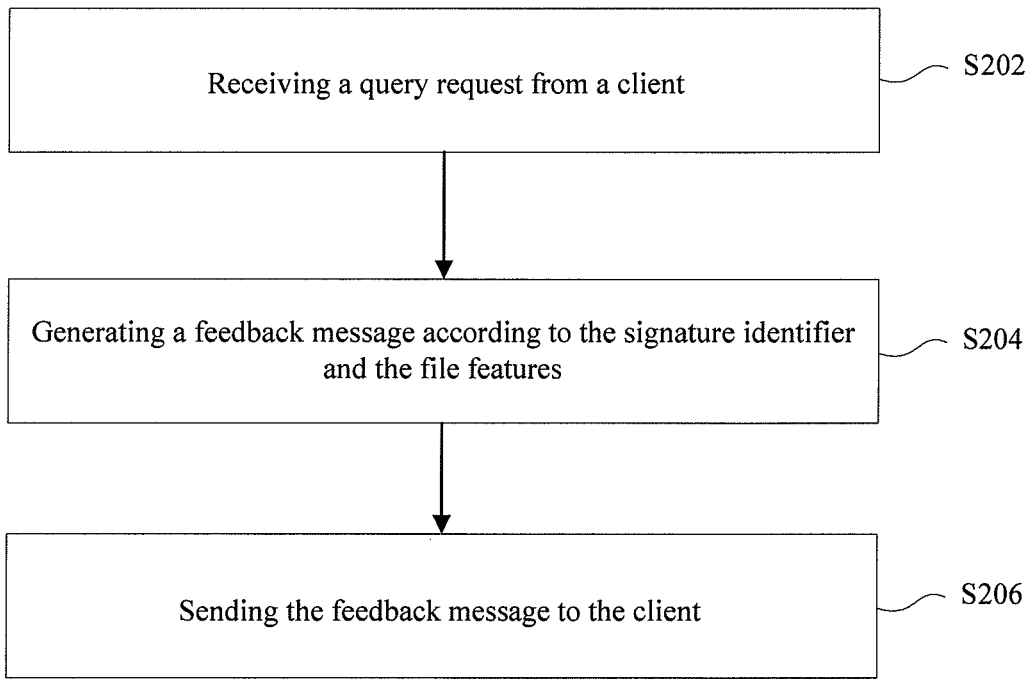
FIG. 2 shows a flow chart of another cloud security-based file processing method according to an embodiment of the invention.

Correspondingly, FIG. 2 shows a flow chart of another cloud security-based file processing method according to an embodiment of the invention. In this method, the server for killing a malicious program is improved, the server is a cloud security server for the client above, and the method specifically comprises the steps S202 to S206.

S202: receiving a query request from a client, wherein the query request comprises the signature identifier of an unknown program file and a part or all of the file features of the unknown program file. The file features in this embodiment have already been specifically introduced in the above-described method, and will not be repeated here.

S204: generating a feedback message according to the signature identifier and the file features.

S206: sending the feedback message to the client, wherein the client performs subsequent process on the unknown program file according to the feedback message.

For example, in this embodiment, when the client Thunder's ThundPlatform.exe loads minizip.dll (minizip.dll is replaced with a Trojan), and it is detected that minizip is not a white file (also called a white program or a trusted program), the server returns a command of deleting the Trojan, and the operation of repairing the Thunder software is performed, which may be performed by the client.

The cloud security-based file processing method provided by the embodiment of the invention enables the server to obtain a corresponding feedback message according to the signature identifier of an unknown program file sent by the client and return it to the client, and the client performs corresponding process on the unknown program file according to the feedback message It is thus clear that the method provided by the embodiment of the invention enables the server to obtain a processing method with respect to an unknown program file of the client in real time and dynamically, and the client kills a malicious program, which solves the problem of breaking through the cloud killing by utilizing a Trojan in the prior art. In addition, as compared to that a new malicious program can be only detected and killed by upgrading a local feature library and an engine program file in the prior art, the method further reduces the time from discovering a malicious program to killing the malicious program, thereby accelerating the speed of fighting against a new malicious program, reducing the information storage amount of the server as well and in turn guaranteeing the security of a client program.

Embodiment Two

This embodiment is a specific application scenario of the above described embodiment One, and by this embodiment, the method provided by the invention can be set forth more clearly and specifically.

Figure 3:
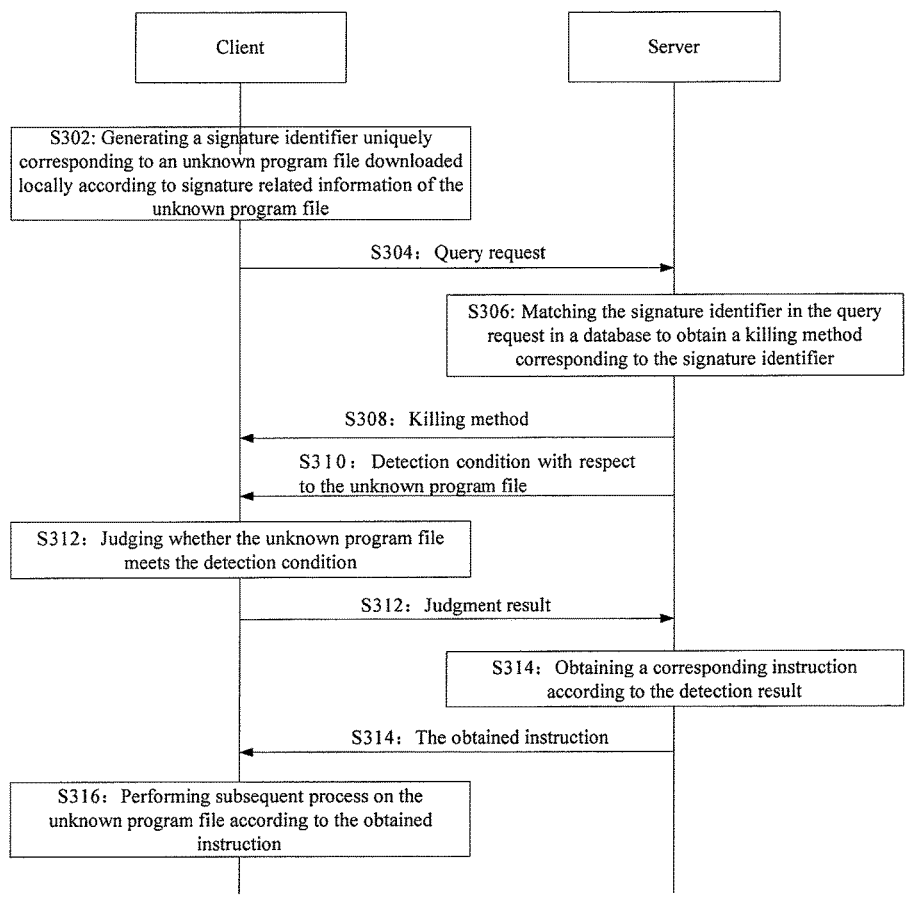
FIG. 3 shows a flow chart of a cloud security-based file processing method according to another embodiment of the invention.

FIG. 3 shows a flow chart of a cloud security-based file processing method in an embodiment of the invention. The method specifically comprises the step S302 to S316.

S302: a client generates a signature identifier uniquely corresponding to an unknown program file downloaded locally according to signature related information of the unknown program file.

It needs to be noted that in this embodiment, when executing a local program file, the client will judge whether each program file is a local known program file to guarantee the knowability of a local program to the client and meanwhile ensure the security of a local program. Therein, a list of program files will be stored in the client, and when a scanned program file is not in the list of program files, the client will judge the program file to be an unknown program file.

Optionally, a specific way of implementing the step comprises:

firstly, scanning the unknown program file to obtain the file features, wherein the file features have been specifically introduced in the above embodiment, and will not be repeated here;

secondly, extracting the signature related information from the obtained file features, wherein the signature related information is the computable field of the file features, and the computable field comprises the remaining part in a PE file except the PE check segment, the signature segment and the signature content, wherein when the length of the obtained file does not reach an integer multiple of 8, the number of bits that it lacks is supplemented with 0 to facilitate its computation;

thirdly, computing the computable field and taking the computation result as the signature identifier.

Optionally, in this embodiment, the computable field is taken as a digest value, and it is computed employing the SHA1 algorithm to obtain a signature identifier uniquely corresponding to the unknown program file.

After generating the signature identifier of the unknown program file, the client performs the step S304, namely, sends a query request to a server end. Therein, the query request carries the signature identifier of the unknown program file and a part or all of the file features of the unknown program file.

After receiving the query request, the server end performs the step S306, that is, matches the signature identifier in the query request in a database to obtain a killing method corresponding to the signature identifier.

It needs to be noted that, the database in this embodiment comprises a local database and/or a cloud database.

Optionally, the killing method in this embodiment may comprise a scanning/judging action and a repair action, etc. Therein, the scanning/judging action comprises scanning and judging an attribute of a program file and the context of the program file, and when it is judged to be a malicious program, performing a corresponding repair operation. Optionally, the repair operation may comprise deleting a specified registry key/value, modifying a registry key/value to be specified content, deleting a specified system service item, repairing/deleting a specified program file, etc., and further comprises guiding a user to start a first aid kit, etc., for example, killing a malicious program in the first aid kit mode, employing a multilayer detection and removal way for the computer basic input/output system→the hard disk master boot record→the operating system driver layer→the operating system application layer, to perform detection and removal process on a virus starting from the bottom layer, which may ensure a thorough removal of viruses existing in individual layers from the application layer to the driver layer, improve the ability of detecting and removing a computer virus and guarantee the security of the computer system.

S308: the server sends the matched killing method to the client.

After receiving the killing method sent by the server, the client performs the step S310, that is, downloads from the server side a detection condition with respect to information parameters of the unknown program file, wherein the detection condition is generated by the server side according to received information parameters (e.g., the file features) of the unknown program file.

After downloading the detection condition, the client performs the step S312, that is, judges whether the unknown program file meets the detection condition, and sends the judgment result to the server.

Optionally, the detection condition in this embodiment comprises at least one of the following:

1) whether a specific file loaded by the PE has an effective signature of a specific company; 2) whether the internal name, product name and company name of a specific file loaded by the PE are specified names; 3) whether a specific hook is mounted in the system; 4) whether there is specific filling data in a specific process; 5) whether there exists a specific driver module or device object in the system, wherein the specific driver module or device object refers to a driver module or device object loaded by a local unknown program; 6) whether a specific registry points to a specific file or a specific CLSID or matches a specific mode, wherein the specific registry, the specific file, the specific CLSID and the specific mode are all generated by an unknown program at the time of loading, and when the program is run, the program is run by the specific registry in the specific mode utilizing the specific file and the specific CLSID; and 7) whether a local unknown file (a file of which the security rank can not be judged to be trusted, which is mainly judged according to the file security rank corresponding to each file) exists in a process chain loaded by the PE, and so on. The reason why PE loads a process chain is that it is necessary to analyze information on the process chain.

The process chain comprises all the parent/child processes that run the program operations. For example, an example of a process chain is: process 1→process 2→process 3, that is, the process 2 is the parent process of the process 3, the process 1 is the parent process of the process 2, the process 2 is the child process of the process 1, and the process 3 is the child process of the process 2. Names of all the processes on the process chain are extracted to determine whether a local unknown file exists. With respect to a parent process and a child process, when creating a process, a function that is created is a child process of the creating function. The information on the process may further comprise other information, for example, the session ID, the priority, a possessed thread, the user's ID, the handler, the process memory counter, the process path, the process command line parameter, the process name, the process creator, the creation time, the exit time, the kernel time, etc., and the invention will not introduce it in detail any more. Starting from the current process, the process chain corresponding to the current process is traced according to the creation relationship, a parent process at each level is searched successively in the process chain, and the file rank of the parent process is obtained; according to the obtained file rank, it can be known whether a local unknown file exists in the process chain loaded by the PE.

For the first kind of detection condition, it may be queried out that the WindStorm StoreUpdate.exe has loaded StormUpdate.dll, and StormUpdate.dll has the signature information of "Beijing Storm Internet Technology Co., Ltd.".

For the second kind of detection condition, for example, it is detected that kernel32.dll has been loaded, the internal name is kernel32, the company name is Microsoft, the product name is Microsoft@Windows@Operating System, and so on.

For the detection condition of whether a specific hook is mounted in the system, for example, a shutdown callback hook function is one or more callback function that will be invoked when Windows is shut down, and after a Trojan is registered, it may write itself from the memory to a disk and set self-startup at the time of shutdown, such that it still can be loaded when the computer is powered on the next time. A common Trojan sample Unifade can be infected repeatedly by registering a shutdown callback hook.

As another example, for the detection condition of whether there exists a specific driver module or device object in the system, svchost.ext is a common system service process, a Trojan will inject its own module into the process remotely, delete its own file to achieve the purpose of stealth, and write itself to a disk at the time of shutdown so as to be loaded when the computer is powered on the next time. An analyzer may extract some binary strings according to features of a Trojan, match these binary strings with the memory of the svchost.exe process and thereby find out the Trojan.

As another example, for the detection condition of whether a specific registry points to a specific file or a specific CLSID or matches a specific mode, for a specific registry, for example, the Ghost Trojan infects the fips.sys driver, the fips driver is loaded by the key HKLM\SYSTEM\CurrentControlSet\Services\Fips, thereby detecting that fips.sys is infected, and meanwhile the object \Driver\fips exists, which may be taken as a condition for judging that the Ghost Trojan virus exists, and so on.

After receiving the detection result, the server performs the step S314, that is, obtains a corresponding instruction according to the detection result, and sends the instruction to the client.

Optionally, a list of instructions or an instruction database is stored at the server side, which stores processing instructions for different detection results. For example, when the server judges that the unknown program file is a malicious file according to the received detection result, it may send to the client a reminder message that the unknown program file might be infected with a malicious program, or also may send an instruction of killing the unknown program file. When the server judges that the unknown program file is a secure file according to the received detection result, it sends to the client a command of releasing the secure file.

After receiving the instruction sent by the server, the client performs the step S316, that is, performs subsequent process on the unknown program file according to the obtained instruction.

Optionally, in this embodiment, when the instruction received by the client is a reminder message that the unknown program file might be infected with a malicious program, it may show the user reminder information that the unknown program file might be infected with a malicious program, to facilitate the user to perform an operation on the program file. For example, the user may choose to kill the program file according to the reminder message, and at this point, after receiving a killing instruction triggered by the user, the client forwards the program file to the server side for killing, which reduces the killing operation of the file by the client and increases the processing speed of the client.

When the instruction received by the client is a killing instruction, it directly kills the unknown program file according to the instruction, which guarantees timely killing of a malicious program.

The invention provides a cloud security-based file processing method. By the invention, the client can obtain a local unknown program file timely, generate a signature identifier uniquely corresponding to the program file and send it to the server end, and the server end can obtain a corresponding feedback message according to the received signature identifier and return it to the client, and the client performs corresponding process on the unknown program file according to the feedback message.

It is thus clear that the method provided by the invention enables the client to obtain a processing method with respect to an unknown program file from the server side in real time and dynamically, and to kill a malicious program timely, which solves the problem of breaking through the cloud killing by utilizing a Trojan in the prior art. For example, a problem is solved that a Trojan uses a DLL hijacking technique to pack a Trojan DLL and a trustable white program together and when the user executes the white program, the Trojan DLL will be loaded.

In addition, as compared to that a new malicious program can be only detected and killed by upgrading a local feature library and an engine program file in the prior art, the method further reduces the time from discovering a malicious program to killing the malicious program, thereby accelerating the speed of fighting against a new malicious program, reducing the information storage amount of the server as well and in turn guaranteeing the security of a client program. The method may be effectively applied to a virus that infects the application layer or the driver layer, and involved viruses that may be processed comprise computer viruses (comprising a general infectious virus, a Word and Excel macro virus, a boot sector virus, a script virus, a Trojan, a backdoor program, a keylogger, a password stealer, etc., which are collectively called "computer viruses").

Embodiment Three

Figure 4:
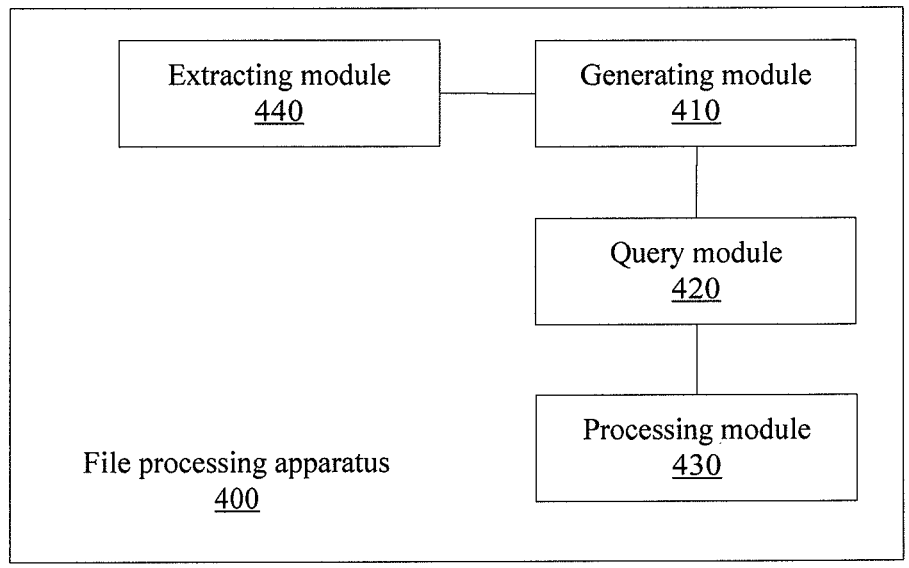
FIG. 4 shows a structural block diagram of a cloud security-based file processing apparatus according to an embodiment of the invention.

FIG. 4 shows a structural block diagram of a cloud security-based file processing apparatus in an embodiment of the invention. The apparatus is implemented in an engine of a client. The apparatus 400 comprises:

a generating module 410 configured to generate a signature identifier uniquely corresponding to an unknown program file downloaded locally according to signature related information of the unknown program file;

a query module 420 coupled with the generating module 410 and configured to send a query request to a server end to query whether the unknown program file is a malicious program or not, wherein the query request carries the signature identifier of the unknown program file and a part or all of the file features of the unknown program file; and a processing module 430 coupled with the query module 420 and configured to receive a feedback message from the server end, and perform subsequent process on the unknown program file according to the feedback message, wherein the server end generates the feedback message according to the signature identifier and the file features.

Optionally, the apparatus further comprises:

an extracting module 440 coupled with the generating module 410 and configured to scan the unknown program file to obtain the file features; and extract the signature related information from the file features.

Optionally, the file features comprise at least one of the following:

the MD5, SHA1, and a feature value calculated according to part of the content extracted from the file.

Optionally, the generating module 410 is further configured to:

obtain the computable field of a portable executable PE file, wherein the computable field is the remaining part in the PE file except the PE check segment, the signature segment and the signature content; and compute the computable field and take the computation result as the signature identifier.

Optionally, the processing module 430 is further configured to:

receive a killing method fed back by the server end and corresponding to the signature identifier when the signature identifier is matched at the server end successfully.

Optionally, the processing module 430 is further configured to:

download from the server end a preset detection condition with respect to information parameters of the unknown program file, and judge whether the unknown program file meets the detection condition; and upload the judgment result to the server end and perform subsequent process according to an instruction of the server end.

Optionally, the processing module 430 is further configured to:

receive from the server end a reminder message that the unknown program file might be infected with a malicious program; and/or kill the unknown program file when receiving from the server end a killing command of killing the unknown program file; and/or kill the unknown program file by the server end when receiving a killing instruction triggered in a user interface.

Optionally, the killing method comprises: performing a scanning/judging action and/or a repair action on the unknown program file.

Figure 5:
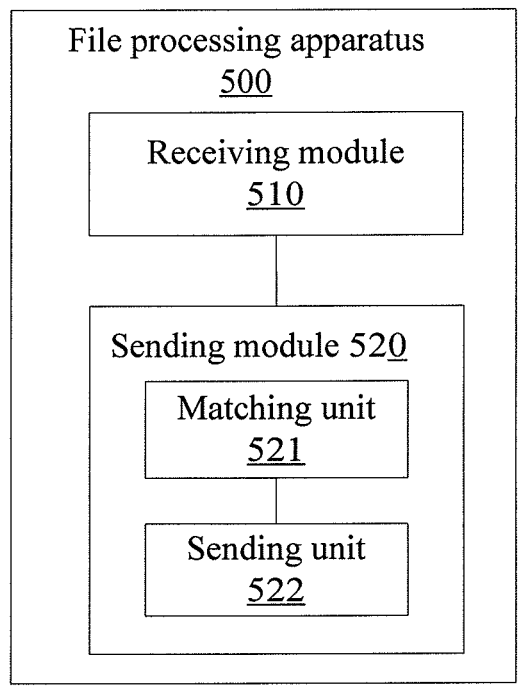
FIG. 5 shows a structural block diagram of another cloud security-based file processing apparatus according to an embodiment of the invention.

FIG. 5 shows a structural block diagram of another cloud security-based file processing apparatus in an embodiment of the invention. The apparatus is implemented in a peer server of the client. The apparatus 500 comprises:

a receiving module 510 configured to receive a query request from a client, wherein the query request comprises the signature identifier of an unknown program file and a part or all of the file features of the unknown program file; and a sending module 520 coupled with the receiving module 510 and configured to generate a feedback message according to the signature identifier and the file features, and send the feedback message to the client, wherein the client performs subsequent process on the unknown program file according to the feedback message.

Optionally, the sending module 520 comprises:

a matching unit 521 configured to match the signature identifier in a database; and a sending unit 522 configured to send a matched killing method to the client.

Optionally, the database comprises: a local database and/or a cloud database.

Optionally, the receiving module 510 is further configured to receive from the client file features of the unknown program file.

Optionally, the sending module 520 is further configured to send a preset detection condition with respect to information parameters of the unknown program file to the client;

the receiving module 510 is further configured to receive the detection result from the client; and the sending module 520 is further configured to sending a corresponding instruction according to the detection result.

Optionally, the sending module 520 is further configured to send to the client a reminder message that the unknown program file might be infected with a malicious program according to the detection result; and/or send a corresponding command according to the detection result, wherein the corresponding command comprises a killing command of killing the unknown program file and a command of releasing a secure file.

The embodiment of the invention provides a cloud security-based file processing apparatus. By the apparatus, the client can obtain a local unknown program file timely, generate a signature identifier uniquely corresponding to the program file and send it to the server end, and the server end can obtain a corresponding feedback message according to the received signature identifier and return it to the client, and the client performs corresponding processing on the unknown program file according to the feedback message.

It is thus clear that the apparatus provided by the invention enables the client to obtain a processing method with respect to an unknown program file from the server side in real time and dynamically, and to kill a malicious program timely, which solves the problem of breaking through the cloud killing by utilizing a Trojan in the prior art. In addition, as compared to that a new malicious program can be only detected and killed by upgrading a local feature library and an engine program file in the prior art, the apparatus further reduces the time from discovering a malicious program to killing the malicious program, thereby accelerating the speed of fighting against a new malicious program, reducing the information storage amount of the server as well and in turn guaranteeing the security of a client program.

In the specification provided herein, a plenty of particular details are described. However, it can be appreciated that an embodiment of the invention may be practiced without these particular details. In some embodiments, well known methods, structures and technologies are not illustrated in detail so as not to obscure the understanding of the specification.

Similarly, it shall be appreciated that in order to simplify the disclosure and help the understanding of one or more of all the inventive aspects, in the above description of the exemplary embodiments of the invention, sometimes individual features of the invention are grouped together into a single embodiment, figure or the description thereof. However, the disclosed methods should not be construed as reflecting the following intention, namely, the claimed invention claims more features than those explicitly recited in each claim. More precisely, as reflected in the following claims, an aspect of the invention lies in being less than all the features of individual embodiments disclosed previously. Therefore, the claims complying with a particular implementation are hereby incorporated into the particular implementation, wherein each claim itself acts as an individual embodiment of the invention.

It may be appreciated to those skilled in the art that modules in a device in an embodiment may be changed adaptively and arranged in one or more device different from the embodiment. Modules or units or assemblies may be combined into one module or unit or assembly, and additionally, they may be divided into multiple sub-modules or sub-units or subassemblies. Except that at least some of such features and/or procedures or units are mutually exclusive, all the features disclosed in the specification (including the accompanying claims, abstract and drawings) and all the procedures or units of any method or device disclosed as such may be combined employing any combination. Unless explicitly stated otherwise, each feature disclosed in the specification (including the accompanying claims, abstract and drawings) may be replaced by an alternative feature providing an identical, equal or similar objective.

Furthermore, it can be appreciated to the skilled in the art that although some embodiments described herein comprise some features and not other features comprised in other embodiment, a combination of features of different embodiments is indicative of being within the scope of the invention and forming a different embodiment. For example, in the following claims, any one of the claimed embodiments may be used in any combination.

Embodiments of the individual components of the invention may be implemented in hardware, or in a software module running on one or more processors, or in a combination thereof. It will be appreciated by those skilled in the art that, in practice, some or all of the functions of some or all of the components in a cloud security-based file processing apparatus according to individual embodiments of the invention may be realized using a microprocessor or a digital signal processor (DSP). The invention may also be implemented as a device or apparatus program (e.g., a computer program and a computer program product) for carrying out a part or all of the method as described herein. Such a program implementing the invention may be stored on a computer readable medium, or may be in the form of one or more signals. Such a signal may be obtained by downloading it from an Internet website, or provided on a carrier signal, or provided in any other form.

Figure 6:
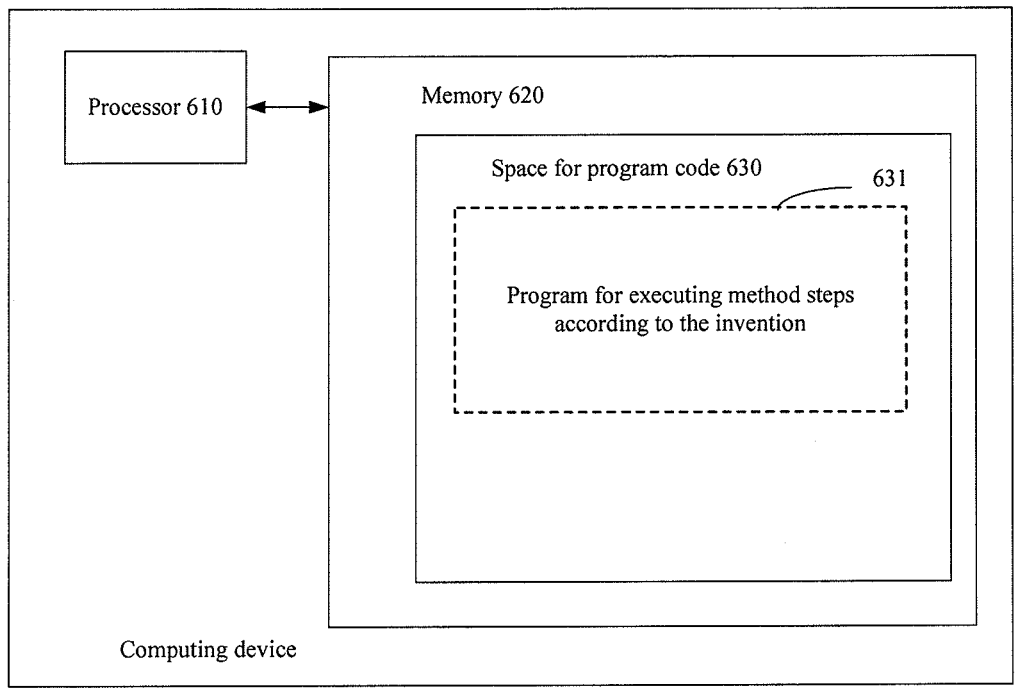
FIG. 6 shows schematically a block diagram of a computing device for performing a cloud security-based file processing method according to the invention.
Figure 7:
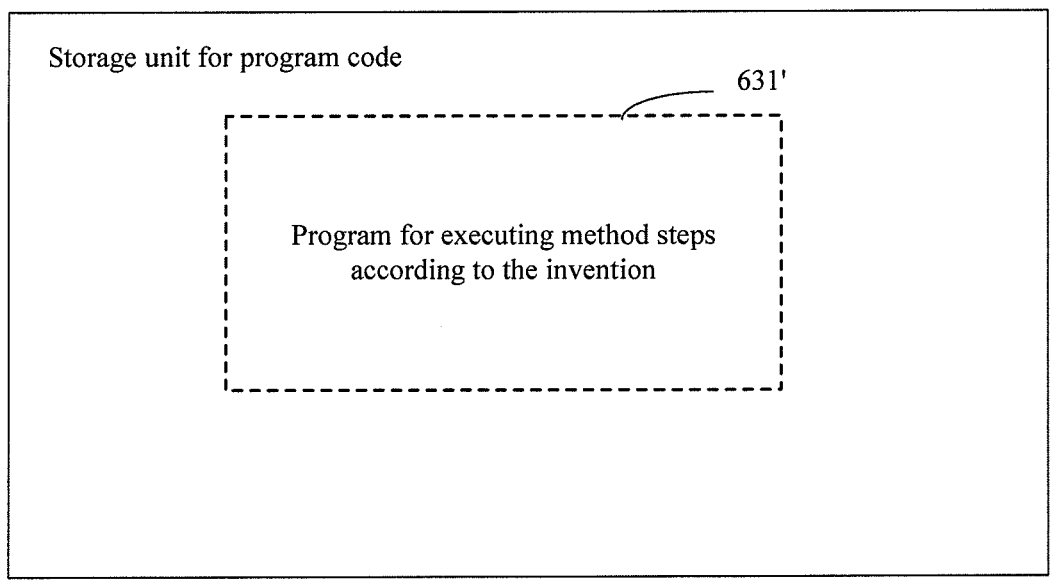
FIG. 7 shows schematically a storage unit for retaining or carrying a program code implementing a cloud security-based file processing method according to the invention.

For example, the invention shows a computing device which may carry out a first cloud security-based file processing method according to the invention, e.g., a client, and a computing device which may carry out a second cloud security-based file processing method according to the invention, e.g., a common application server. With reference to FIG. 6, the computing device traditionally comprises a processor 610 and a computer program product or a computer readable medium in the form of a memory 620. The memory 620 may be an electronic memory such as a flash memory, an EEPROM (electrically erasable programmable read-only memory), an EPROM, a hard disk or a ROM. The memory 620 has a memory space 630 for a program code 631 for carrying out any method steps in the methods as described above. For example, the memory space 630 for a program code may comprise individual program codes 631 for carrying out individual steps in the above methods, respectively. The program codes may be read out from or written to one or more computer program products. These computer program products comprise such a program code carrier as a hard disk, a compact disk (CD), a memory card or a floppy disk. Such a computer program product is generally a portable or stationary storage unit as described with reference to FIG. 7. The storage unit may have a memory segment, a memory space, etc. arranged similarly to the memory 620 in the server of FIG. 6. The program code may for example be compressed in an appropriate form. In general, the storage unit comprises a computer readable code 631', i.e., a code which may be read by e.g., a processor such as 610, and when run by a computing device, the codes cause the computing device to carry out individual steps in the methods described above.

"An embodiment", "the embodiment" or "one or more embodiments" mentioned herein implies that a particular feature, structure or characteristic described in connection with an embodiment is included in at least one embodiment of the invention. In addition, it is to be noted that, examples of a phrase "in an embodiment" herein do not necessarily all refer to one and the same embodiment.

It is to be noted that the above embodiments illustrate rather than limit the invention, and those skilled in the art may design alternative embodiments without departing the scope of the appended claims. In the claims, any reference sign placed between the parentheses shall not be construed as limiting to a claim. The word "comprise" does not exclude the presence of an element or a step not listed in a claim. The word "a" or "an" preceding an element does not exclude the presence of a plurality of such elements. The invention may be implemented by means of a hardware comprising several distinct elements and by means of a suitably programmed computer. In a unit claim enumerating several apparatuses, several of the apparatuses may be embodied by one and the same hardware item. Use of the words first, second, and third, etc. does not mean any ordering. Such words may be construed as naming.

Furthermore, it is also to be noted that the language used in the description is selected mainly for the purpose of readability and teaching, but not selected for explaining or defining the subject matter of the invention. Therefore, for those of ordinary skills in the art, many modifications and variations are apparent without departing the scope and spirit of the appended claims. For the scope of the invention, the disclosure of the invention is illustrative, but not limiting, and the scope of the invention is defined by the appended claims.

The invention claimed is:

1. A cloud security-based file processing method comprising:
   generating a signature identifier uniquely corresponding to an unknown program file downloaded locally according to signature related information of the unknown program file;
   sending a query request to a server end to query whether the unknown program file is a malicious program or not, wherein the query request carries the signature identifier of the unknown program file and a part or all of the file features of the unknown program file; and
   receiving a feedback message from the server end, and performing subsequent process on the unknown program file according to the feedback message, wherein the server end generates the feedback message according to the signature identifier and the file features, wherein the performing subsequent process on the unknown program file according to the feedback message comprises:
   receiving a killing method fed back by the server end and corresponding to the signature identifier when the signature identifier is matched at the server end successfully;
   downloading from the server end a preset detection condition with respect to information parameters of the unknown program file, and judging whether the unknown program file meets the detection condition; and
   uploading a judgment result to the server end and performing subsequent process according to an instruction of the server end,
   wherein the detection condition comprises at least one of the following:
   whether a specific hook is mounted in a system;
   whether there is specific filling data in a specific process;

whether there exists a specific driver module or device object in the system;
whether a specific registry points to a specific file or a specific unique identifier CLSID or matches a specific mode; and
whether a file of which a security is unknown exists in a process chain loaded by the PE.

2. The method as claimed in claim 1, wherein the signature related information and the file features are obtained according to the following steps comprising:
scanning the unknown program file to obtain the file features; and
extracting the signature related information from the file features.

3. The method as claimed in claim 1, wherein the file features comprise at least one of the following:
MD5, SHA1, and a feature value calculated according to part of content extracted from the file.

4. The method as claimed in claim 1, wherein the generating a signature identifier uniquely corresponding to an unknown program file downloaded locally according to signature related information of the unknown program file comprises:
obtaining a computable field of a portable executable PE file, wherein the computable field is the remaining part in the PE file except a PE check segment, a signature segment and a signature content; and
computing the computable field and taking a computation result as the signature identifier.

5. The method as claimed in claim 1, wherein the detection condition further comprises at least one of the following:
whether the specific file loaded by the PE has an effective signature of a specific company; and
whether an internal name, product name and company name of the specific file loaded by the PE are specified names.

6. The method as claimed in claim 1, wherein the performing subsequent process according to an instruction of the server end comprises:
receiving from the server end a reminder message that the unknown program file might be infected with a malicious program; and/or
killing the unknown program file when receiving from the server end a killing command of killing the unknown program file; and/or
killing the unknown program file by the server end when receiving a killing instruction triggered in a user interface.

7. The method as claimed in claim 1, wherein the killing method comprises: a scanning and judging action and/or a repair action.

8. A cloud security-based file processing method comprising:
receiving a query request from a client, wherein the query request comprises a signature identifier of an unknown program file and a part or all of the file features of the unknown program file;
generating a feedback message according to the signature identifier and the file features; and
sending the feedback message to the client, wherein the client performs subsequent process on the unknown program file according to the feedback message, wherein the sending the feedback message to the client comprises:
matching the signature identifier in a database;
returning a matched killing method to the client;
sending a preset detection condition with respect to information parameters of the unknown program file to the client;
receiving a detection result from the client; and
sending corresponding instruction according to the detection result, wherein the detection condition comprises at least one of the following:
whether a specific hook is mounted in a system;
whether there is specific filling data in a specific process;
whether there exists a specific driver module or device object in the system;
whether a specific registry points to a specific file or a specific unique identifier CLSID or matches a specific mode; and
whether a file of which a security is unknown exists in a process chain loaded by the PE.

9. The method as claimed in claim 8, wherein the database comprises: a local database and/or a cloud database.

10. The method as claimed in claim 8, wherein before the receiving a query request from the client, there is receiving from the client file features of the unknown program file.

11. The method as claimed in claim 8, wherein the sending corresponding instruction according to the detection result comprises:
sending to the client a reminder message that the unknown program file might be infected with a malicious program according to the detection result; and/or
sending a corresponding command according to the detection result, wherein the corresponding command comprises a killing command of killing the unknown program file and a command of releasing a secure file.

12. A non-transitory computer readable medium having instructions stored thereon that, when executed by a computing device, cause the computing device to perform cloud security-based file processing operations, the operations comprising:
generating a signature identifier uniquely corresponding to an unknown program file downloaded locally according to signature related information of the unknown program file;
sending a query request to a server end to query whether the unknown program file is a malicious program or not, wherein the query request carries the signature identifier of the unknown program file and a part or all of the file features of the unknown program file; and
receiving a feedback message from the server end, and performing subsequent process on the unknown program file according to the feedback message, wherein the server end generates the feedback message according to the signature identifier and the file features, wherein the performing subsequent process according to the feedback message comprises:
receiving a killing method fed back by the server end and corresponding to the signature identifier when the signature identifier is matched at the server end successfully;
downloading from the server end a preset detection condition with respect to information parameters of the unknown program file, and judging whether the unknown program file meets the detection condition; and
uploading a judgment result to the server end and performing subsequent process according to an instruction of the server end, wherein the detection condition comprises at least one of the following:
whether a specific hook is mounted in a system;

whether there is specific filling data in a specific process;

whether there exists a specific driver module or device object in the system;

whether a specific registry points to a specific file or a specific unique identifier CLSID or matches a specific mode; and whether a file of which a security is unknown exists in a process chain loaded by the PE.

* * * * *